Patented Oct. 11, 1938

2,132,388

UNITED STATES PATENT OFFICE 2,132,388

ALIPHATIC ACID DIAMIDE OF LONG CHAIN ALIPHATIC DIAMINES AND PROCESS OF MAKING THE SAME

Gerard J. Berchet, Wilmington, Del., assignor to E. I. du Pont de Nemours & Company, Wilmington, Del., a corporation of Delaware No Drawing. Application July 2, 1937, Serial No. 151,763

11 Claims. (Cl. 260—404)

This invention relates to new organic chemical compounds and processes for the preparation thereof, and more particularly to aliphatic diamides especially those of polymethylene diamides of at least six carbon atoms with saturated monobasic aliphatic acids of at least five carbon atoms.

This invention has as an object the preparation of new organic compounds. A further object is the preparation of new compounds useful as plasticizers, insecticides, slip promoters and waxes. Other objects will appear hereinafter.

These objects are accomplished by the following invention wherein a diamine $NH_2$—R—$NH_2$, in which R is a saturated open-chain hydrocarbon radical of at least six carbon atoms, is reacted, preferably in an inert atmosphere and under conditions set forth more fully below, with an acid R'COOH, wherein R' is a saturated open-chain hydrocarbon radical of at least five carbon atoms, or with an amide-forming derivative of said acid, such as the anhydride, an amide, a halide, or an ester thereof, the resulting amide then being isolated. The principal acids and amide-forming derivatives thereof suitable for use in the invention have the comprehensive formula R'—CO—Q where R' has the definition just given and Q is a radical whose hydride Q—H is miscible with water.

In carrying out the invention the appropriate amine and acid are heated together in the proportion of about one mol of amine to two moles of acid, and at temperatures in the range of about 160 to 280° C., and preferably 180 to 210° C. The reaction is complete when no more water is evolved. The products are obtained in substantially pure form but may be further purified if desired by washing with aqueous alkali and crystallizing from suitable solvents, such as lower aliphatic alcohols. The reaction should preferably be carried out in an inert atmosphere such as nitrogen. In the case of amide-forming derivatives of the acid, temperatures should be altered in accordance with the reactivity of the particular derivative used. Acid halides react a great deal faster, and esters of the acids somewhat slower, than the free acid. The former may be combined with the amine at room temperature.

The more detail practice of the invention is ilustrated by the following examples, wherein parts given are by weight unless otherwise stated. There are of course many forms of the invention other than these specific embodiments.

*Example I*

A mixture of 11.6 parts of hexamethylenediamine and 56.9 parts stearic acid was heated for 1.5 hours at 250° C. The reaction was conducted in an apparatus so arranged that the water vapor formed during the reaction could be removed and condensed. The weight of water formed served as an indication of the extent of reaction. The reaction vessel contained an inlet tube extending nearly to the surface of the reaction mixture. Oxygen-free nitrogen was passed through this tube throughout the course of the process. At the end, the product was cooled somewhat and then dissolved in 500 parts of boiling n-butanol. On cooling the resultant solution, 60 parts of hexamethylenedistearamide of the formula $$C_{17}H_{35}—CO—NH—(CH_2)_6—NH—CO—C_{17}H_{35}$$

separated out as a white crystalline solid. This material melted at 139.5–140° C., and elementary analysis disclosed that it contained 4.61% nitrogen, 77.64% carbon, and 12.81% hydrogen (calculated value: 4.32%, 77.77%, and 12.96% respectively).

*Example II*

A solution of 25 parts of hexamethylenediamine in 100 parts of ethyl ether was slowly dropped with stirring into a solution of 92 parts of lauric acid chloride in 250 parts of ethyl ether. The reaction produced considerable heat. The hexamethylenedilauramide $$C_{11}H_{23}—CO—NH(CH_2)_6—NH—CO—C_{11}H_{23}$$

(100 parts) precipitated from the solution as a white crystalline powder. It was filtered off and washed repeatedly with dilute alkali. On recrystallization from alcohol it melted at 146–147° C. Analysis showed 5.66% nitrogen, the calculated value being 5.83%.

The above examples illustrate typical methods by which any of the amides contemplates by the invention may be produced. These amides have the comprehensive formula $$R'—CO—NH—R—NH—CO—R'$$

in which R and R' are saturated open-chain and preferably straight chain hydrocarbon radicals, R having at least six carbons, and R' at least five. They may be considered as derived from diamines $NH_2$—R—$NH_2$ and acids R'—COOH. This process of this invention may be employed in the preparation of and is generic to the preparation of diamides from aliphatic primary diamines of at least six carbon atoms and saturated aliphatic monocarboxylic acids of at least six carbon atoms. Any such amine and any such acid may be used. The amine may be formulated as $H_2N-R'-NH_2$ wherein R' is a divalent aliphatic and preferably a polymethylene radical of at least six carbon atoms. Straight chain amines are preferred because of the properties of the diamides therefrom. Specific amines suitable for use in the invention include 2,5-diaminohexane, 1,4-diamino-2-methylpentane, heptamethylenediamine, octamethylenediamine, 2,5-diamino-2,5-dimethylhexane, nonamethylenediamine, 2,6-diamino-2,6-dimethylheptane, decamethylenediamine, dodecamethylenediamine and undecamethylenediamine. The acid may be formulated as RCOOH wherein R is a saturated aliphatic hydrocarbon or alkyl radical which may be straight or branched chain. The process is generic in these acids. Specific acids that are suitable include n-valeric, iso-valeric, caproic, 2-methylpentanoic, 4-methylpentanoic, 2,2-dimethylbutyric, 5-methylhexanoic, 3,3-dimethylpentanoic, 3-ethyl-4-methylpentanoic, 2-methylnonanoic, 3-ethylnonanoic, 2-n-amylnonanoic, heptadecanoic, behenic, cerotic, montanic, melissic, oenanthylic, caprylic, pelargonic, capic, undecanoic, myristic, tridecanoic, palmitic, margarinic, nonadecanoic and arachidic acids, and mixtures of acids derived from hydrogenated fats and oils. Among the amide-forming derivatives of the acid, which may be used instead of the free acid, are the following: valerianic anhydride, isobutyl iso-valerianate, caproic amide, ethyl 5-methylhexanoate, oenanthylic acid chloride, tricaprylin, methylpelargonate, capric amide, methyl undecylate, α-monolaurin, tridecylic amide, myristic anhydride, myricyl palmitate, tristearin, ethyl behenate, and melissic acid chloride.

The products of the present invention may also be prepared by subjecting to pyrolysis (alone or in the presence of solvents such as phenol, cresols, and o-hydroxydiphenyl and of inert gases such as hydrogen, water gas, and nitrogen), the addition salt formed between the amine and monocarboxylic acid. This addition salt may or may not first be isolated and purified. Temperatures for the pyrolysis may range from 120° C. to about 300° C., but should preferably be from 160 to 260° C. The progress of the pyrolysis can be followed by measuring the water formed.

So far as is known, the products herein described are new to the art. Their specific structure, involving certain minimum carbon contents in the amine and acid part of the molecule, is reflected in their properties which make them useful as components of high melting waxes, as plasticizers and as "slip-promoting agents", i. e., coatings for cellulosic sheeting to prevent such sheets from sticking to each other.

The above description and examples are intended to be illustrative only. Any modification of or variation therefrom which conforms to the spirit of the invention is intended to be included within the scope of the claims.

I claim:
1. A compound of the formula

$$R'-CO-NH-R-NH-CO-R'$$

wherein R and R' are saturated open chain hydrocarbon radicals, R having at least six carbon atoms and R' at least five.

2. A compound according to claim 1 wherein R is a straight chain radical.
3. A compound according to claim 1 wherein R and R' are straight chain radicals.
4. A compound according to claim 1 wherein R is hexamethylene.
5. Hexamethylenedistearamide.
6. Hexamethylenedilauramide.
7. Process of forming diamides which comprises reacting a diamine of the formula $NH_2-R-NH_2$ with a compound of the formula $R'-CO-Q$, R and R' being saturated open chain hydrocarbon radicals (R having at least six carbon atoms and R' at least five), and Q being a radical whose hydride QH is miscible with water.
8. Process of forming diamides which comprises reacting a diamine of the formula $NH_2-R-NH_2$ with an acid of the formula $R'-COOH$, R and R' being saturated open chain hydrocarbon radicals (R having at least six carbon atoms, and R' at least five), and removing the water formed.
9. Process according to claim 8, in which R is a straight chain radical.
10. Process according to claim 8 in which R and R' are straight chain radicals.
11. Process of forming diamides which comprises reacting a diamine of the formula $NH_2-R-NH_2$ with a compound of the class consisting of acids of the formula $R'-COOH$ and amide-forming derivatives thereof, wherein R and R' are saturated open-chain hydrocarbon radicals, R having at least six carbon atoms and R' at least five.

GERARD J. BERCHET.

---

CERTIFICATE OF CORRECTION.

Patent No. 2,132,388.           October 11, 1938.

GERARD J. BERCHET.

It is hereby certified that error appears in the printed specification of the above numbered patent requiring correction as follows: Page 1, first column, line 19, after the word "under" insert other; and second column, line 42, for "contemplates" read contemplated; and that the said Letters Patent should be read with this correction therein that the same may conform to the record of the case in the Patent Office.

Signed and sealed this 27th day of December, A. D. 1938.

Henry Van Arsdale (Seal)           Acting Commissioner of Patents.

monocarboxylic acids of at least six carbon atoms. Any such amine and any such acid may be used. The amine may be formulated as $H_2N—R'—NH_2$ wherein R' is a divalent aliphatic and preferably a polymethylene radical of at least six carbon atoms. Straight chain amines are preferred because of the properties of the diamides therefrom. Specific amines suitable for use in the invention include 2,5-diaminohexane, 1,4-diamino-2-methylpentane, heptamethylenediamine, octamethylenediamine, 2,5-diamino-2,5-dimethylhexane, nonamethylenediamine, 2,6-diamino-2,6-dimethylheptane, decamethylenediamine, dodecamethylenediamine and undecamethylenediamine. The acid may be formulated as RCOOH wherein R is a saturated aliphatic hydrocarbon or alkyl radical which may be straight or branched chain. The process is generic in these acids. Specific acids that are suitable include n-valeric, iso-valeric, caproic, 2-methylpentanoic, 4-methylpentanoic, 2,2-dimethylbutyric, 5-methylhexanoic, 3,3-dimethylpentanoic, 3-ethyl-4-methylpentanoic, 2-methylnonanoic, 3-ethylnonanoic, 2-n-amylnonanoic, heptadecanoic, behenic, cerotic, montanic, melissic, oenanthylic, caprylic, pelargonic, capic, undecanoic, myristic, tridecanoic, palmitic, margarinic, nonadecanoic and arachidic acids, and mixtures of acids derived from hydrogenated fats and oils. Among the amide-forming derivatives of the acid, which may be used instead of the free acid, are the following: valerianic anhydride, isobutyl iso-valerianate, caproic amide, ethyl 5-methylhexanoate, oenanthylic acid chloride, tricaprylin, methylpelargonate, capric amide, methyl undecylate, α-monolaurin, tridecylic amide, myristic anhydride, myricyl palmitate, tristearin, ethyl behenate, and melissic acid chloride.

The products of the present invention may also be prepared by subjecting to pyrolysis (alone or in the presence of solvents such as phenol, cresols, and o-hydroxydiphenyl and of inert gases such as hydrogen, water gas, and nitrogen), the addition salt formed between the amine and monocarboxylic acid. This addition salt may or may not first be isolated and purified. Temperatures for the pyrolysis may range from 120° C. to about 300° C., but should preferably be from 160 to 260° C. The progress of the pyrolysis can be followed by measuring the water formed.

So far as is known, the products herein described are new to the art. Their specific structure, involving certain minimum carbon contents in the amine and acid part of the molecule, is reflected in their properties which make them useful as components of high melting waxes, as plasticizers and as "slip-promoting agents", i. e., coatings for cellulosic sheeting to prevent such sheets from sticking to each other.

The above description and examples are intended to be illustrative only. Any modification of or variation therefrom which conforms to the spirit of the invention is intended to be included within the scope of the claims.

I claim:
1. A compound of the formula

$$R'—CO—NH—R—NH—CO—R'$$

wherein R and R' are saturated open chain hydrocarbon radicals, R having at least six carbon atoms and R' at least five.
2. A compound according to claim 1 wherein R is a straight chain radical.
3. A compound according to claim 1 wherein R and R' are straight chain radicals.
4. A compound according to claim 1 wherein R is hexamethylene.
5. Hexamethylenedistearamide.
6. Hexamethylenedilauramide.
7. Process of forming diamides which comprises reacting a diamine of the formula $NH_2—R—NH_2$ with a compound of the formula $R'—CO—Q$, R and R' being saturated open chain hydrocarbon radicals (R having at least six carbon atoms and R' at least five), and Q being a radical whose hydride QH is miscible with water.
8. Process of forming diamides which comprises reacting a diamine of the formula $NH_2—R—NH_2$ with an acid of the formula $R'—COOH$, R and R' being saturated open chain hydrocarbon radicals (R having at least six carbon atoms, and R' at least five), and removing the water formed.
9. Process according to claim 8, in which R is a straight chain radical.
10. Process according to claim 8 in which R and R' are straight chain radicals.
11. Process of forming diamides which comprises reacting a diamine of the formula $NH_2—R—NH_2$ with a compound of the class consisting of acids of the formula $R'—COOH$ and amide-forming derivatives thereof, wherein R and R' are saturated open-chain hydrocarbon radicals, R having at least six carbon atoms and R' at least five.

GERARD J. BERCHET.

---

CERTIFICATE OF CORRECTION.

Patent No. 2,132,388. October 11, 1938.

GERARD J. BERCHET.

It is hereby certified that error appears in the printed specification of the above numbered patent requiring correction as follows: Page 1, first column, line 19, after the word "under" insert other; and second column, line 42, for "contemplates" read contemplated; and that the said Letters Patent should be read with this correction therein that the same may conform to the record of the case in the Patent Office.

Signed and sealed this 27th day of December, A. D. 1938.

Henry Van Arsdale (Seal) Acting Commissioner of Patents.